Patented Dec. 18, 1951

2,579,010

UNITED STATES PATENT OFFICE 2,579,010

HYDROGENATION OF THIOPHENIC COMPOUNDS CONTAINING AN UNSATURATED SIDE CHAIN

Herman Pines and Bruno Kvetinskas, Chicago, Ill., assignors to Universal Oil Products Company, Chicago, Ill., a corporation of Delaware No Drawing. Application July 1, 1949,
Serial No. 102,702

6 Claims. (Cl. 260—329)

This invention relates to a process for hydrogenating thiophenic compounds containing an unsaturated side chain to produce a thiophenic compound containing a saturated side chain.

An object of this invention is to hydrogenate an alkenyl thiophene to an alkyl thiophene.

Another object of this invention is to hydrogenate a thiophenic carbonyl compound to a thiophenic alcohol.

One specific embodiment of this invention relates to a process for hydrogenating only the unsaturated side chain of thiophenic compounds containing said side chains which comprises reacting hydrogen and a thiophenic compound containing an unsaturated side chain at hydrogenation conditions in the presence of a catalyst selected from the group consisting of palladium and platinum.

Another embodiment of this invention relates to a process for hydrogenating only the unsaturated side chain of thiophenic compounds containing said side chains which comprises reacting hydrogen and a thiophenic compound containing an unsaturated side chain at hydrogenation conditions in the presence of a palladium catalyst.

The usual hydrogenation catalysts such as those containing nickel, copper chromite and the like, do not effectively catalyze the hydrogenation of alkenyl thiophenes because of the fact that these catalysts become poisoned quickly by sulfur. In the presence of sulfur some more-active catalysts, such as those containing molybdenum and nickel, cobalt and the like, promote hydrogenation with breaking of the thiophenic ring and the elimination of sulfur as hydrogen sulfide. Accordingly, it is not possible to hydrogenate alkenyl thiophenes to alkyl thiophenes in the presence of such catalysts which are commonly referred to as sulf-active catalysts. It was found, however, that catalysts formed from alumina and relatively minor proportions of palladium are effective in hydrogenating unsaturated side chains of thiophenic compounds containing such unsaturated side chains without breaking the thiophene ring and also without saturating the thiophenic ring.

The catalysts preferred for this purpose contain from about 0.3 to about 30% by weight of palladium supported by alumina and other carriers containing alumina such as clays, silica-alumina composites and the like.

Other catalysts which may be used in the process contain platinum and also mixtures of palladium and other hydrogenation catalysts including platinum. Thus effective catalysts comprise palladium and platinum oxides and palladium and platinum sulfides supported by alumina, charcoal, asbestos, silica and the like. Similarly, the aforementioned proportions of palladium may also be deposited on other carriers in the manner used for preparing palladium-alumina catalysts.

Alkenyl thiophenes such as butenyl thiophene, pentenyl thiophene, and the like, which are formed by reacting a conjugated diolefin with thiophene in the presence of an acidic catalyst are particularly good starting materials for this process. The unsaturation of the alkenyl group may be hydrogenated so that an alkyl group is formed without hydrogenation of the thiophenic ring or breaking of the thiophenic ring such as occurs in the presence of certain sulf-active catalysts.

This process may also be used in converting thiophenic ketones and thiophenic aldehydes which may be referred to broadly as thiophenic carbonyl compounds into thiophenic alcohols. In all of these compounds, the unsaturation that is subjected to the hydrogenation process is found in a side chain of the thiophenic starting material. Thus pentenyl thiophene may be hydrogenated to pentyl thiophene and a carbonyl thiophene such as acetothiophene is hydrogenated readily to methylthenyl carbinol. Other sulfur containing organic compounds such as alkenyl thiophenol may also be hydrogenated in the presence of the aforementioned catalysts without breaking the aromatic ring.

The process is carried out in a suitable reactor such as a steel pressure vessel in which the thiophenic compound and hydrogen are subjected to a temperature of from about 30° to about 250° C. and preferably at a temperature of from about 80° to about 150° C. in the presence of the alumina-palladium catalyst or other suitable catalyst as referred to above. The process is also carried out at a superatmospheric pressure which is generally not in excess of about 120 atmospheres.

The following examples are given to illustrate the character of results obtained by the present process although the data presented should not be construed to limit unduly the generally broad scope of the invention.

*Example I*

The catalyst used in this run was prepared by adding a colloidal suspension of palladium sulfide to a slurry of wet alumina in an amount sufficient to give a dried catalyst containing 0.3% palladium. The alumina after being composited with an indicated amount of palladium was then filtered from the aqueous material and the resultant filter cake was dried at a temperature of from about 150° to about 400° C. to give a catalytic material.

Pentenyl thiophene was hydrogenated in the presence of the above-indicated palladium alumina catalyst. In this run, the penteny thiophene was a freshly distilled sample made by reacting thiophene with isoprene in the presence of 85% phosphoric acid at a temperature of from 24° to 37° C. In carrying out the hydrogenation 10.1 grams of the pentenyl thiophene and 3 grams of a catalyst containing 0.3% palladium deposited on alumina were placed in a steel autoclave of 450 cc. capacity, hydrogen was added to an initial pressure of 100 atmospheres and the autoclave was heated, at a temperature of 100° C. for 7 hours, during which time a pressure drop of 2 atmospheres occurred. More than 95% of the pentenyl thiophene was reduced to amyl thiophene. After distillation of the hydrogenated product, the infra-red spectrum of the sample was compared with that of tertiary amyl thiophene and with that of unreacted pentenyl thiophene. The hydrogenation sample was not the same as tertiary amyl thiophene. Other experimental data indicated that the pentenyl thiophene, namely, 1-thienyl-3-methyl-butene-2 was hydrogenated to 1-thienyl-3-methylbutane.

*Example II*

8 grams of the pentenyl thiophene referred to in Example I and 2.5 grams of a platinum-alumina catalyst (5% by weight platinum) were placed in a steel autoclave of 125 cc. capacity, hydrogen was added to a pressure of 100 atmospheres and the charged autoclave was heated at a temperature of 100° C. for 9 hours, at 110° C. for 3.5 hours, and at 120° C. for 3 hours more. Determination of the infra-red spectrum on the resultant reaction product showed it to consist of 80% of 1-thienyl-3-methylbutane and 20% of unconverted 1-thienyl-3-methylbutene-2.

We claim as our invention:

1. A process for hydrogenating only the unsaturated side chain of a thiophenic compound containing said side chain which comprises reacting said thiophenic compound and hydrogen at a temperature of from about 30° to about 250° C. and at a superatmospheric pressure in the presence of a catalyst comprising essentially palladium and alumina.

2. A process for hydrogenating only the unsaturated side chain of a thiophenic compound containing said side chain which comprises reacting said thiophenic compound and hydrogen at a temperature of from about 30° to about 250° C. and at a superatmospheric pressure in the presence of a catalyst consisting of from about 0.3 to about 30% by weight of palladium and from about 99.7 to about 70% by weight of activated alumina.

3. A process for hydrogenating only the unsaturated side chain of a thiophenic compound containing said side chain which comprises reacting said thiophenic compound and hydrogen at a temperature of from about 80° to about 150° C. and at a superatmospheric pressure in the presence of a catalyst consisting of from about 0.3 to about 30% by weight of palladium and from about 99.7 to about 70% by weight of activated alumina.

4. A process for producing an alkyl thiophene which comprises reacting an alkenyl thiophene and hydrogen at a temperature of from about 30° to about 250° C. and at a superatmospheric pressure in the presence of a catalyst comprising essentially palladium and alumina.

5. A process for producing an alkyl thiophene which comprises reacting an alkenyl thiophene and hydrogen at a temperature of from about 80° to about 150° C. and at a superatmospheric pressure up to about 120 atmospheres in the presence of a catalyst consisting of from about 0.3 to about 30% by weight of palladium and from about 99.7 to about 70% by weight of activated alumina.

6. A process for producing 1-thienyl-3-methylbutane which comprises reacting 1-thienyl-3-methylbutene-2 and hydrogen at a temperature of from about 80° to about 150° C. and at a superatmospheric pressure up to about 120 atmospheres in the presence of a catalyst consisting of from about 0.3 to about 30% by weight of palladium and from about 99.7 to about 70% by weight of activated alumina.

HERMAN PINES.
BRUNO KVETINSKAS.

REFERENCES CITED

The following references are of record in the file of this patent:

UNITED STATES PATENTS

| Number | Name | Date |
|---|---|---|
| 2,106,735 | Gwynn | Feb. 1, 1938 |
| 2,451,248 | Morris | Oct. 12, 1948 |
| 2,471,077 | Moore | May 24, 1949 |
| 2,487,051 | Mozingo | Nov. 8, 1949 |